United States Patent
Ji et al.

(10) Patent No.: US 11,588,605 B2
(45) Date of Patent: Feb. 21, 2023

(54) RESOURCE SCHEDULING METHOD AND APPARATUS, DATA TRANSMISSION METHOD AND APPARATUS AND COMMUNICATION SYSTEM

(71) Applicant: FUJITSU LIMITED, Kawasaki (JP)

(72) Inventors: Pengyu Ji, Beijing (CN); Jian Zhang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/031,336

(22) Filed: Sep. 24, 2020

(65) Prior Publication Data

US 2021/0006383 A1 Jan. 7, 2021

Related U.S. Application Data

(63) Continuation of application No. PCT/CN2018/081627, filed on Apr. 2, 2018.

(51) Int. Cl.
*H04L 5/00* (2006.01)
*H04W 72/04* (2009.01)
(Continued)

(52) U.S. Cl.
CPC .......... *H04L 5/0094* (2013.01); *H04L 5/0098* (2013.01); *H04W 72/042* (2013.01); *H04W 72/0453* (2013.01); *H04W 72/1263* (2013.01)

(58) Field of Classification Search
CPC .......... H04W 72/042; H04W 72/1263; H04W 72/0453; H04L 5/0094; H04L 5/0098; H04L 5/001; H04L 5/0064; H04L 5/0053
See application file for complete search history.

(56) References Cited

U.S. PATENT DOCUMENTS

2018/0049203 A1* 2/2018 Xue .................. H04L 5/0035
2020/0120650 A1* 4/2020 Yi .................... H04J 11/00

FOREIGN PATENT DOCUMENTS

| CN | 107659994 A | 2/2018 |
|----|-------------|--------|
| JP | 2020-528718 A | 9/2020 |
| WO | 2019/050379 A1 | 3/2019 |

OTHER PUBLICATIONS

Notice of Reasons for Refusal issued by the Japan Patent Office for corresponding Japanese Patent Application No. 2020-552796, dated Nov. 30, 2021, with an English translation.

(Continued)

*Primary Examiner* — Jianye Wu
(74) *Attorney, Agent, or Firm* — Myers Wolin, LLC

(57) ABSTRACT

A resource scheduling method and apparatus, data transmission method and apparatus and communication system. The resource scheduling apparatus includes: a first receiving unit configured to, on a first BWP, receive downlink control information carried by a first control resource set; and a determining unit configured to, when a size of the downlink control information is determined by a second BWP, determine that a first starting position that is frequency domain scheduled on the first BWP is a second starting position of a frequency domain range of the first control resource set. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

10 Claims, 9 Drawing Sheets

(51) Int. Cl.
H04W 72/12 (2009.01)
H04W 72/0453 (2023.01)
H04W 72/1263 (2023.01)

(56) References Cited

OTHER PUBLICATIONS

International Search Report and Written Opinion issued by the State Intellectual Property Office of the P.R. China for corresponding International Patent Application No. PCT/CN2018/081627, dated Dec. 28, 2018, with an English translation.
Ericsson, "Outcome of Offline Session on 7 .1.3.1.4 (DCI Contents and Formats)", Agenda Item: 7.1.3.1.4, 3GPP TSG-RAN WG1 Meeting #92, R1-1803369, Athens, Greece, Feb. 26-Mar. 2, 2018.
ITRI, "Discussion on DCI Format 0-0/0-1", Agenda Item: 7.1.3.1.4, 3GPP TSG-RAN WG1 Meeting #92, R1-1802089, Athens, Greece, Feb. 26-Mar. 2, 2018.
LG Electronics, "Remaining issues on DCI contents and formats", Agenda Item: 7.1.3.1.4, 3GPP TSG-RAN WG1 Meeting #92, R1-1802209, Athens, Greece, Feb. 26-Mar. 2, 2018.
3GPP TS 38.212 V15.0.0, "3rd Generation Partnership Project; Technical Specification Group Radio Access Network; NR; Multiplexing and channel coding" (Release 15), Dec. 2017.

* cited by examiner

701 configuration information is transmitted to a terminal equipment; the configuration information being of at least one frequency domain offset relative to a starting position of a second BWP configured by a network device

RESOURCE SCHEDULING METHOD AND APPARATUS, DATA TRANSMISSION METHOD AND APPARATUS AND COMMUNICATION SYSTEM

CROSS REFERENCE TO RELATED APPLICATIONS

This application is a continuation application of International Application No. PCT/CN2018/081627, filed on Apr. 2, 2018, the contents of which are incorporated herein by reference.

TECHNICAL FIELD

This disclosure relates to the field of communication technologies, and in particular to a resource scheduling method and apparatus, a data transmission method and apparatus and a communication system.

BACKGROUND

In the long term evolution (LIE) system Release 15, the maximum channel bandwidth may reach 400 MHz (i.e., a wide carrier). If a user equipment with a broadband capability has always been operating on the above wide carrier, the power consumption may be large. Hence, a bandwidth part (BWP) is introduced in the 3rd Generation Partnership Project (3GPP), with a motivation being to optimize power consumption of a terminal equipment.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In a future wireless communication system, such as a 5G, new radio (NR) system, a plurality of uplink or downlink bandwidth parts (BWPs) may be simultaneously configured for a terminal equipment, including an initial BWP, a default IMP, and an active BWP, etc. One or more of the BWPs are activated in a predetermined time, so that a user equipment performs data transceiving in resources allocated on the activated uplink and downlink BWPs within the predetermined time.

In present discussions, a network device may transmit a common message, such as a system message, a paging message, and a random access response message, via an initial BWP in an initial access phase, or may transmit a common message, such as a system message, a paging message, and a random access response message, on an active BWP. However, it was found by the inventors that the active BWP is individually configured for each terminal equipment, and if a system message, a paging message, and a random access response message are transmitted on the active BWP configured for each terminal equipment, the system overhead is relatively large.

In addition, since a plurality of uplink or downlink BWPs are configured, an active BWP may be switched as demanded by actual data transmission. However, it was found by the inventors that if the terminal equipment does not receive indication information indicating switch of the BWP or mis-decoding occurs, understanding of the current active BWP between the terminal equipment and the network device may be ambiguous, that is, the terminal equipment still operates on the original active BWP, and the network device will deem that the terminal equipment will be switched to a new active BWP, since it has transmitted indication information on the BWP switch, which will result in unavailability of downlink data.

In order to solve the above problem, embodiments of this disclosure provide a resource scheduling method and apparatus, data transmission method and apparatus and communication system, in which more terminal equipments may be made to receive and share common messages and system resource overhead may be saved. And furthermore, it may be used to receive a dedicated message from the terminal equipment, so as to ensure robustness when the BWP is switched, thereby solving an existing problem.

According to a first aspect of the embodiments of this disclosure, there is provided a resource scheduling apparatus, including:

a first receiving unit configured to, on a first BWP, receive downlink control information carried by a first control resource set; and a determining unit configured to, when a size of the downlink control information is determined by a second BWP, determine that a first starting position that is frequency domain scheduled on the first BWP is a second starting position of a frequency domain range of the first control resource set.

According to a second aspect of the embodiments of this disclosure, there is provided a resource scheduling apparatus, including:

a first receiving unit configured to, on a first BWP, receive downlink control information carried by a first control resource set; and a determining unit configured to, when a size of the downlink control information is determined by a second BWP, determine that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, the determining unit determines that the first starting position is a starting position of the second BWP.

According to a third aspect of the embodiments of this disclosure, there is provided a data transmission apparatus, including:

a first transmitting unit configured to transmit downlink control information to a terminal equipment on a first BWP;

a data mapping unit configured to map data onto one or more predetermined resources; wherein, when a size of the downlink control information is determined by a second BWP, a first starting position of the data that can be mapped onto the predetermined resources is a second starting position of a frequency domain range of a first control resource set configured on the first BWP; and a second transmitting unit configured to transmit the data to the terminal equipment on the predetermined resources.

According to a fourth aspect of the embodiments of this disclosure, there is provided a resource scheduling method, including:

on a first BWP, receiving downlink control information carried by a first control resource set; and when a size of the downlink control information is determined by a second BWP, determining that a first starting position that is frequency domain scheduled on the first BWP is a second starting position of a frequency domain range of the first control resource set.

According to a fifth aspect of the embodiments of this disclosure, there is provided a resource scheduling method, including:

on a first BWP, receiving downlink control information carried by a first control resource set; and when a size of the downlink control information is determined by a second BWP, determining that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, determining that the first starting position is a starting position of the second BWP.

According to a sixth aspect of the embodiments of this disclosure, there is provided a data transmission method, including:

transmitting downlink control information to a terminal equipment on a first BWP;

mapping data onto one or more predetermined resources; wherein, when a size of the downlink control information is determined by a second BWP, a first starting position of the data that can be mapped onto the predetermined resources is a second starting position of a frequency domain range of a first control resource set configured on the first BWP; and transmitting the data to the terminal equipment on the predetermined resources.

According to a seventh aspect of the embodiments of this disclosure, there is provided a communication system, including a terminal equipment, the terminal equipment including the resource scheduling apparatus as described in the first or the second aspect.

An advantage of the embodiments of this disclosure exists in that according to the embodiments of this disclosure, when a size of downlink control information is determined by a BWP, the terminal equipment makes that a starting position of its frequency domain scheduling is a starting position of a frequency domain of a control resource set configured on another BWP. Hence, more terminal equipments may be made to receive and share common messages and system resource overhead may be saved. And furthermore, it may be used to receive a dedicated message from the terminal equipment, so as to ensure robustness when the BWP is switched, thereby solving an existing problem.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
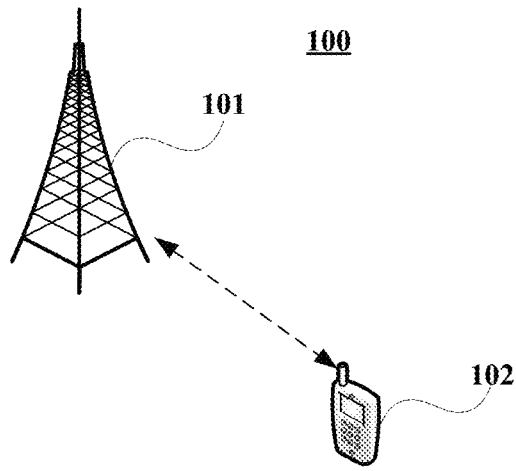
FIG. 1 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. The embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses terminal equipment to the communication network and provides services for the terminal equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communication system of an embodiment of this disclosure, in which a case where a piece of terminal equipment and a network device are taken as examples is schematically shown. As shown in FIG. 1, a communication system 100 may include a network device 101 and terminal equipment 102. For the sake of simplicity, FIG. 1 shall be described by taking only one piece of terminal equipment and a network device as an example; however, the embodiment of this disclosure is not limited thereto.

In the embodiment of this disclosure, existing traffics or traffics that may be implemented in the future may be performed between the network device 101 and the terminal equipment 102. For example, such traffics may include but not limited to an enhanced mobile broadband (eMBB), massive machine type communication (MTC), and ultra-reliable and low-latency communication (URLLC).

The embodiments of this disclosure shall be described below by taking an NR system as an example. However, this disclosure is not limited thereto, and is also applicable to any systems in which similar problems exist.

The embodiments of this disclosure shall be described below with reference to the accompanying drawings.

Embodiment 1

Figure 2:
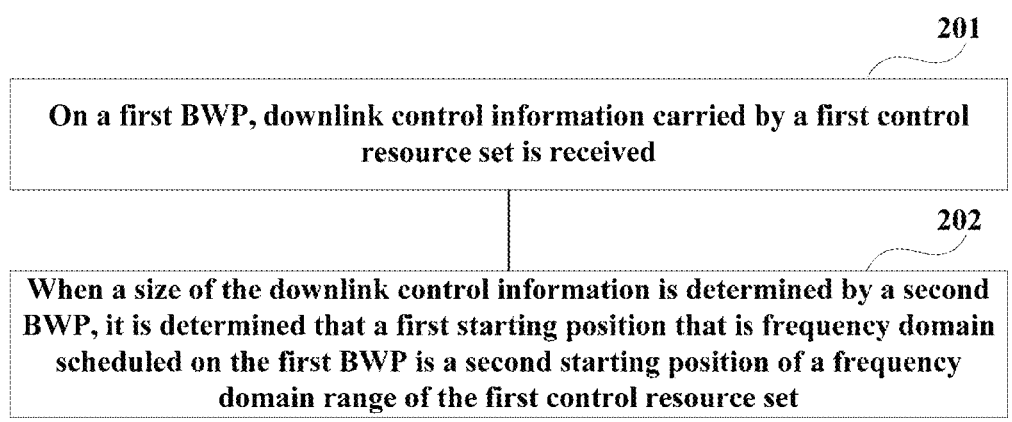
FIG. 2 is a schematic diagram of the resource scheduling method of Embodiment 1.

FIG. 2 is a schematic diagram of the resource scheduling method of Embodiment 1, which is applicable to a terminal equipment side. As shown in FIG. 2, the method includes:

step 201: on a first BWP, downlink control information carried by a first control resource set is received; and step 202: when a size of the downlink control information is determined by a second BWP, it is determined that a first starting position that is frequency domain scheduled on the first BWP is a second starting position of a frequency domain range of the first control resource set.

In an embodiment, the first control resource set (CORESET) is a set of physical resource blocks configured by the network device on the first BWP, and may be used to carry a physical downlink control channel (PDCCH). Information carried by the PDCCH is downlink control information (DCI), and functions of different DCI are different. For example, it is used to indicate downlink scheduling information, power control information, or uplink scheduling information, etc., and may be differentiated by DCI in different formats. The relevant art may be referred to for particular implementations of the above techniques, and this embodiment is not limited thereto.

In an embodiment, in step 201, the terminal equipment demodulates the DCI in the PDCCH by blindly detecting the PDCCH in the first control resource set, so as to receive the downlink control information, so that a physical downlink shared channel (PDSCH) of its own at a corresponding resource position is demodulated according to resource allocation information, or the like, in the downlink control information, so as to obtain data, or the like, transmitted on the PDSCH. A search range used for the blind detection by the terminal equipment is currently divided into a common search space (CSS) and a UE-specific search space (USS), and reference may be made to the relevant art for an implementation of how to receive the DCI, such as performing PDCCH descrambling to receive DCI by using a radio network temporary identifier (RNTI), which shall not be described herein any further.

In an embodiment, for downlink control information of different formats and/or detected in the search space, their sizes may be determined by the first BWP, or may be determined by a second BWP different from the first BWP; that a size of the downlink control information is determined by a second BWP includes: a format of the downlink control information being 1-0, and the downlink control information being detected in a common search space, or a format of the downlink control information being 1-0, and the downlink control information being detected in a dedicated search space; and that a size of the downlink control information is determined by the first BWP includes: a format of the downlink control information being 0-1, or 1-1, etc. However, they are illustrative only, and this embodiment is not limited thereto. And reference may be made to the relevant art for particular formats of format 0-0 or 1-0, 0-1 or 1-1 of the downlink control information, such as 3GPP TS 38.212, Chapter 7.3.1, which shall not be described herein any further.

In an embodiment, the scheduling information in the DCI may include: a format indicator of the DCI, time-frequency domain resource allocation information, coding and modulation information, and the like, and reference may be made to 3GPP TS 38.212, Chapter 7.3.1 for details. When the size of the DCI is determined by the second BWP, it means that the number of bits used by the frequency domain resource allocation information in the DCI is determined according to the second BWP; for example, the number of bits is equal to $\lceil \log_2(N_{RB}^{DL,BWP}(N_{RB}^{DL,BWP}+1)/2) \rceil$; where, $N_{RB}^{DL,BWP}$ denotes the number of downlink resource blocks of the second BWP.

In an embodiment, in step 202, the format of the DCI may be determined according to the DCI format indicator in the DCI received in step 201, and furthermore, whether the size of the DCI is determined by the second BWP is determined. When the format of the DCI is 1-0 and the downlink control information is detected in the common search space, or, when the format of the downlink control information is 1-0, and the downlink control information is detected in the dedicated search space, it is determined that the size of the DCI is determined by the second BWP, and the DCI is used for scheduling of the PDSCH; and when the size of the downlink control information is determined by the second BWP, it is determined that a first starting position that is frequency domain scheduled on the first BWP is a second starting position of a frequency domain range of the first control resource set, that is, the first starting position is aligned with the second starting position of the frequency domain range of the first control resource set, rather than taking a frequency domain starting position of the first BWP as a starting point of the downlink resource scheduling, the first starting position is used as the starting point of downlink resource scheduling, and furthermore, according to the resource allocation information in the DCI, resources on which the data transmitted by the network device are received are determined.

In an embodiment, the starting position may be denoted by an index of a physical resource block, and the second starting position of the frequency domain range of the first control resource set may be a frequency domain starting position of a physical resource block included in the first control resource set having a lowest index, that is, the first starting position may be a frequency domain starting position of physical resource block having a lowest index in the first control resource set.

Figure 3:
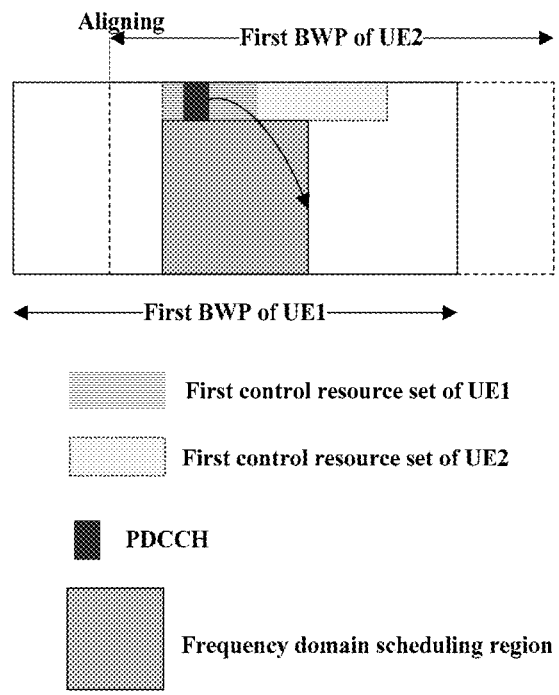
FIGS. 3 and 4 are schematic diagrams of scheduling a starting position respectively.

FIG. 3 is a schematic diagram of the frequency domain scheduling in this embodiment. As shown in FIG. 3, the first starting position of the frequency domain scheduling for the first BWP of UE1 and UE2 is a frequency domain starting position of a physical resource block in the first control resource set configured on the first BWP having a lowest index, that is, the first starting position is aligned with the frequency domain starting position of the physical resource block having a lowest index in the first control resource set.

In an embodiment, in step 202, after the frequency domain scheduling starting position is determined, when the size of the DCI is determined by the second BWP, a frequency domain width that may be scheduled may be determined according to the size of the second BWP, such as determining that the maximum number of consecutive physical resource blocks occupied by the frequency domain width that is able to be scheduled is equal to the number of physical resource blocks occupied by the second BWP; the number of the physical resource blocks occupied by the second BWP is equal to a highest index of the physical resource blocks occupied by the second BWP subtracted by a lowest index thereof plus 1, the highest index and the lowest index of the physical resource blocks occupied by the second BWP being determined by third configuration information transmitted by the network device for the second BWP, that is, the method may further include: receiving third configuration information of the second BWP transmitted by the network device, the third configuration information including the highest index and the lowest index of the physical resource blocks occupied by the second BWP. Furthermore, the method may further include: receiving second configuration information of the first BWP transmitted by the network device, the second configuration information including a highest index of physical resource blocks of the first BWP, the number of physical resource blocks between the highest index and the first starting position being greater than or equal to the number of physical resource blocks occupied by the second BWP. In other words, the terminal device does not expect to receive the second configuration information that the number of the physical resource blocks between the highest index and the first starting position is smaller than the number of the physical resource blocks occupied by the second BWP, so as to ensure that a largest number of the consecutive physical resource blocks occupied by the frequency domain width that is able to be scheduled is equal to the number of physical resource blocks occupied by the second BWP.

In an embodiment, in performing the frequency domain scheduling, the terminal equipment performs scheduling according to a subcarrier spacing of the first BWP. The "able to" described above indicates a frequency domain width that is able to be scheduled by the terminal equipment, but does not indicate a resource that is actually received by the data.

In an embodiment, the second BWP may be an initial BWP, and the first BWP may be a currently activated BWP;

however, this embodiment is not limited thereto. For example, the second BWP may also be a default BWP, and the first BWP may also be a BWP to be switched, and the like.

In one embodiment, before the step 201 or 202, the method may further include: receiving first configuration information of the first control resource set configured on the first BWP transmitted by the network device, the first configuration information including information on the frequency domain range of the first control resource set; when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

In this embodiment, the first configuration information includes frequency domain range information of the first control resource set. And furthermore, the first configuration information may include identification information (ID) of the first control resource set, a demodulation reference signal (DMRS) scrambling sequence, a manner of mapping a resource element group (REG) to a control channel element (CCE), and frequency domain position information on the first control resource set in the first BWP (indicated via a bitmap, each bit indicating a predetermined number of physical resource blocks), and reference may be made to the relevant art for particulars, which shall not be described herein any further. The first configuration information may be carried by radio resource control (RRC) signaling, and the frequency domain range information may be configured via the frequency domain position information in the configuration information, or may be configured by adding an information element of the frequency domain range information into the first configuration information; however, this embodiment is not limited thereto.

In this embodiment, the manner of mapping a resource element group in the first control resource set to a control channel element may be interleaving (distributed mapping) or non-interleaving (centralized mapping), and a particular manner of mapping may be configured via the above configuration information.

Figure 4:
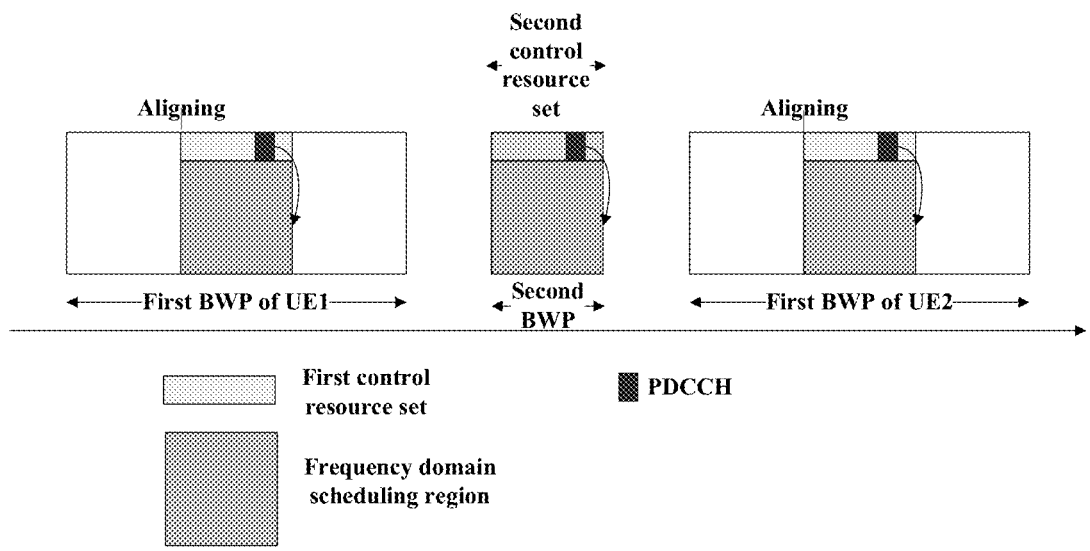

FIG. 4 is a schematic diagram of frequency domain scheduling in this embodiment. As shown in FIG. 4, for the first BWP of the UE, the frequency domain range of the first control resource set configured thereon is equal to the frequency domain range of the second control resource set configured on the second BWP (which is an example only, and may be equal to a predetermined scaling factor multiplied by the frequency domain range of the second control resource set), and the first starting position of the frequency domain scheduling is a frequency domain starting position of a physical resource block having a lowest index in the first control resource set configured on the first BWP, that is, the first starting position is aligned with the frequency domain starting position of the physical resource block having the lowest index in the first control resource set.

In an embodiment, the size of the downlink control information carried in the first control resource set is determined by the second BWP, but the frequency domain range of the first control resource set and the frequency domain range of the second control resource set configured by the network device on the second BWP are different, or the frequency domain range of the first control resource set is not equal to the frequency domain range of the second control resource set configured by the network device on the second BWP multiplied by the predetermined scaling factor. And a manner of mapping a resource element group to a control channel element is non-interleaving, i.e. centralized mapping, and a particular manner of mapping may be configured via the above first configuration information.

In an embodiment, implementations of the frequency domain range of the first control resource set and the frequency domain range of the second control resource set will be described at a network device side in Embodiment 2, which shall not be described herein any further.

In an embodiment, the method may further include (optional, not shown): receiving, on the first BWP, a common message and/or a dedicated message. In this step, according to that the first starting position is taken as the starting point of the scheduling in step 202, a largest number of the consecutive physical resource blocks occupied by the frequency domain width that is able to be scheduled is equal to the number of the physical resource blocks occupied by the second BWP, and in combination with the resource allocation information in the DCI, the common message and/or the dedicated message is/are received on a PDSCH of the first BWP.

It can be seen from the above embodiments that the terminal equipment makes that the starting position of its frequency domain scheduling is aligned with the starting position of the frequency domain of the control resource set configured on another BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 2

Figure 5:
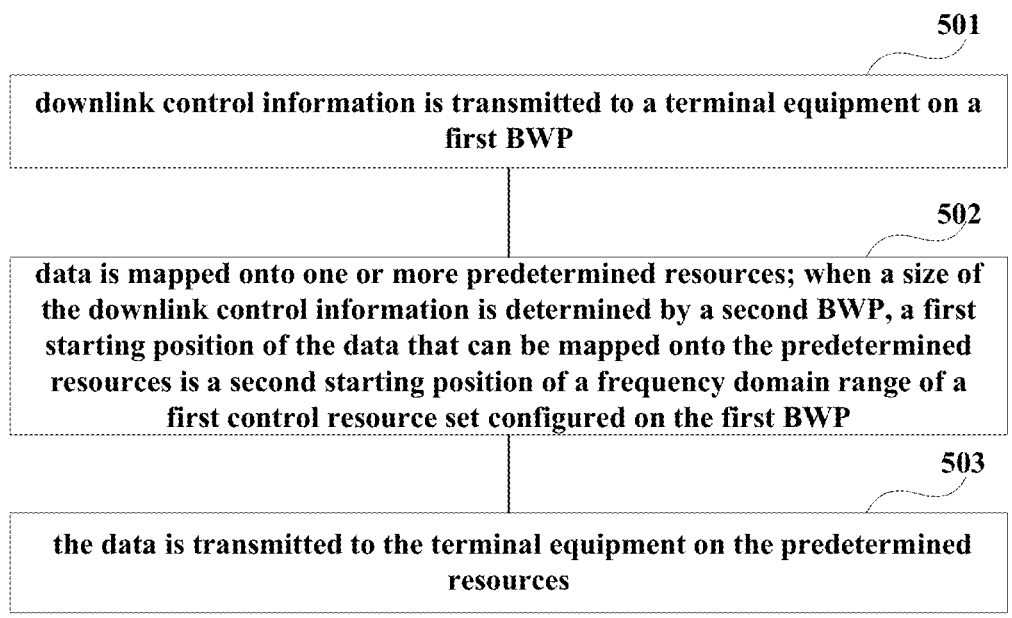
FIG. 5 is a schematic diagram of the data transmission method of Embodiment 2.

FIG. 5 is a schematic diagram of the data transmission method of Embodiment 2, which is applicable to a network device side. As shown in FIG. 5, the method includes:

step 501: downlink control information is transmitted to a terminal equipment on a first BWP;

step 502: data is mapped onto one or more predetermined resources; when a size of the downlink control information is determined by a second BWP, a first starting position of the data that can be mapped onto the predetermined resources is a second starting position of a frequency domain range of a first control resource set configured on the first BWP; and step 503: the data is transmitted to the terminal equipment on the predetermined resources.

In an embodiment, step 501 corresponds to step 201 in Embodiment 1, and shall not be described herein any further.

In an embodiment, in step 502, after the network device schedules the resource for transmitting data by transmitting the DCI in step 501, the data configured at a higher layer need to be mapped onto the physical resource blocks of the PDSCH; when the size of the DCI is not determined by the first BWP transmitting the DCI, but is determined by the second BWP different from the first BWP, the first starting position onto which the data may be mapped on the predetermined resource is a second starting position of a frequency domain range of the first control resource set configured on the first BWP, that is, the first starting position is aligned with the second starting position.

In an embodiment, reference may be made to Embodiment 1 for an implementation that the size of the DCI is determined by the second BWP, which shall not be described herein any further.

In an embodiment, the starting position may be denoted by an index of a physical resource block, and the second starting position of the frequency domain range of the first control resource set may be a frequency domain starting position of a physical resource block included in the first control resource set having a lowest index, that is, the first starting position may be a frequency domain starting position of physical resource block having a lowest index in the first control resource set.

In an embodiment, in step 502, the frequency domain width of the predetermined resource onto which the data may be mapped is determined according to the size of the second BWP; the maximum number of the consecutive physical resource blocks occupied by the frequency domain width of the predetermined resource onto which the data may be mapped is determined as being equal to the number of the physical resource blocks occupied by the second BWP; the number of the physical resource blocks occupied by the second BWP is equal to a highest index of the physical resource blocks occupied by the second BWP subtracted by a lowest index thereof plus 1, the highest index and the lowest index of the physical resource blocks occupied by the second BWP being determined by configuration information of the second BWP configured by the network device, that is, the method may further include: configuring the second BWP by the network device, and transmitting third configuration information of the first BWP. Furthermore, the method may further include: configuring the first BWP by the network device, and transmitting second configuration information of the first BWP. Reference may be made to Embodiment 1 for particular implementations of the second configuration information and the third configuration information, which shall not be described herein any further.

In an embodiment, the "able to" described above indicates a frequency domain width that the data are able to be mapped, but does not indicate a resource that is actually transmitted by the data.

In an embodiment, in step 502, the data may be mapped onto the predetermined resource in a centralized mapping manner or a distributed mapping manner, that is, virtual resource blocks are mapped onto the physical resource blocks. In the centralized resource mapping manner, positions of the VRBs and the PRBs are in one-to-one correspondence. And in the distributed resource mapping manner, the positions of the VRBs and the PRBs are not one-to-one, that is, consecutive VRBs will be mapped onto inconsecutive PRBs, and reference may be made to the relevant art for particular distributed and centralized mapping manners, which shall not be described herein any further.

In an embodiment, when the distributed mapping is performed, the data are mapped into a predetermined frequency domain range of the predetermined resource in a distributed manner. The predetermined frequency domain range is equal to the size of the second BWP, and distributed mapping is performed in the predetermined frequency domain range, so as to ensure that a maximum number of consecutive physical resource blocks occupied by the frequency domain width of the predetermined resource onto which the data may be mapped is equal to the number of the physical resource blocks occupied by the second BWP.

In an embodiment, in step 503, after the mapping of the data is completed, the data are transmitted on the predetermined resource; the data may be in a common message and/or a dedicated message, etc., which are not limited in this embodiment.

In an embodiment, the method may further include (not shown):

transmitting to the terminal equipment configuration information of the first control resource set configured by the network device on the first BWP, the configuration information including information on a frequency domain range of the first control resource set;

when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

In an embodiment, the second BWP may be an initial BWP, and the first BWP may be a currently activated BWP; however, this embodiment is not limited thereto. For example, the second BWP may also be a default BWP, and the first BWP may also be a BWP to be switched, and the like.

In an embodiment, the second control resource set is a set of physical resource blocks configured by the network device on the second BWP, and the second control resource set configured by the network device on the second BWP may be an initial downlink control resource set on the initial BWP, which may be configured for the terminal equipment via a broadcast control channel. Reference may be made to the relevant art for particulars, which shall not be described in this embodiment any further.

In an embodiment, a particular meaning of the first control resource set has been described in Embodiment 1, and the network device configures the configuration information of the first control resource set for the terminal device on the first BWP; the first configuration information includes frequency domain range information of the first control resource set. And furthermore, the first configuration information may include identification information (ID) of the first control resource set, a demodulation reference signal (DMRS) scrambling sequence, a manner of mapping a resource element group (REG) to a control channel element (CCE), and frequency domain position information on the first control resource set in the first BWP (indicated via a bitmap, each bit indicating a predetermined number of physical resource blocks), and reference may be made to the relevant art for particulars, which shall not be described herein any further. The first configuration information may be carried by radio resource control (RRC) signaling, and the frequency domain range information may be configured via the frequency domain position information in the configuration information, or may be configured by adding an information element of the frequency domain range information into the configuration information; however, this embodiment is not limited thereto.

In an embodiment, when the size of the downlink control information carried in the first control resource set is determined by the second BWP (refer to Embodiment 1 for a particular implementation), rather than determined by the first BWP, the frequency domain range of the first control resource set is identical to the frequency domain range of the second control resource set configured by the network device on the second BWP, or the frequency domain range of the first control resource set is equal to the frequency domain range of the second control resource set configured by the network device on the second BWP multiplied by a predetermined scaling factor.

In one embodiment, when a subcarrier spacing of the first BWP is identical to a subcarrier spacing of the second BWP, a bandwidth of the frequency domain range of the first control resource set is identical to a bandwidth of a frequency domain range of a second control resource set configured by the network device on the second BWP, that is, the number of the physical resource blocks contained in the frequency domain range of the first control resource set is identical to the number of the physical resource blocks contained in the frequency domain range of the second control resource set; the physical resource blocks occupied by the first control resource set and/or the second control resource set are consecutive, or inconsecutive, and the bandwidth of the frequency domain range may be denoted by the number of physical resource blocks multiplied by a frequency domain range of a physical resource block (12× subcarrier spacing), and the number of physical resource blocks contained in the frequency domain range is equal to a highest index of physical resource blocks occupied by a control resource set subtracted by a lowest index thereof plus 1.

Figure 6A:
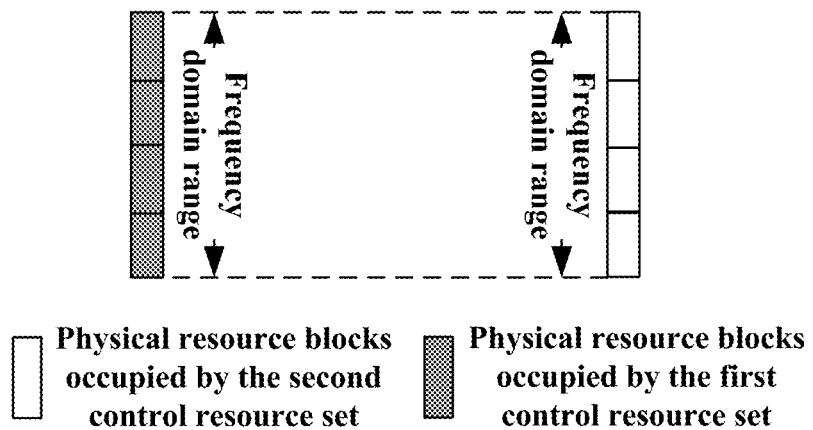
FIGS. 6A and 6B are schematic diagrams of the frequency domain range of the first/second control resource sets of Embodiment 2.

The frequency domain range of the first control resource set in this embodiment shall be described below with reference to FIG. 6A. As shown in FIG. 6A, the frequency domain range of the second control resource set includes four physical resource blocks, and the subcarrier spacing of the first BWP and that of the second BWP are identical, which are both N, that is, the frequency domain range of the first control resource set also includes four physical resource blocks, and the bandwidth of the frequency domain range of the first control resource set and the bandwidth of the frequency domain range of the second control resource set are both equal to 12×4N; the physical resource blocks occupied by the second control resource set in the frequency domain range may be consecutive (for example, 4 physical resource blocks are all occupied), or may be inconsecutive (for example, only a first, third, and fourth physical resource blocks are occupied), and the physical resource blocks occupied by the first control resource set in the frequency domain may be consecutive or inconsecutive, and a particular implementation thereof is identical to that of the second control resource set, which shall not be described herein any further.

In another embodiment, when the subcarrier spacing of the first BWP and that of the second BWP are different, the bandwidth of the frequency domain range of the first control resource set is equal to the bandwidth of the frequency domain range of the second control resource set configured by the network device on the second BWP multiplied by a predetermined scaling factor, or the number of the physical resource blocks contained in the frequency domain range of the first control resource set is identical to the number of the physical resource blocks contained in the frequency domain range of the second control resource set, and the scaling factor is equal to a ratio of the subcarrier spacing of the first BWP to the subcarrier spacing of the second BWP; the physical resource blocks occupied by the first control resource set and/or the second control resource set are consecutive, or inconsecutive, and the bandwidth of the frequency domain range may be denoted by the number of physical resource blocks multiplied by a frequency domain range of a physical resource block (12×subcarrier spacing), and the number of physical resource blocks contained in the frequency domain range is equal to a highest index of physical resource blocks occupied by a control resource set subtracted by a lowest index thereof plus 1.

Figures 6B, 7:
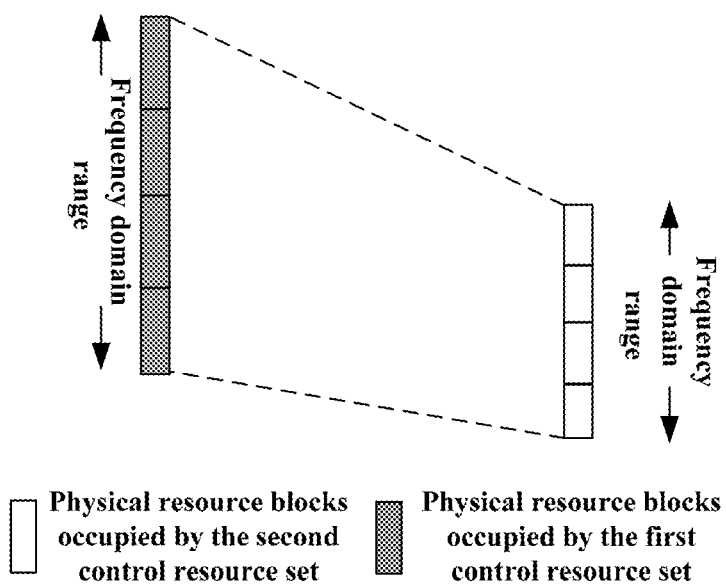
FIG. 7 is a schematic diagram of the resource configuration method of Embodiment 3.

The frequency domain range of the first control resource set in this embodiment shall be described below with reference to FIG. 6B. As shown in FIG. 6B, the subcarrier spacing M of the first BWP is a (a scaling factor) times of the subcarrier spacing N of the second BWP, the bandwidth of the frequency domain range of the second control resource set is 12×4N, and the bandwidth of the frequency domain range of the first control resource set is 12×4M, that is, it is equal to 12×4αN; the number of the physical resource blocks contained in the frequency domain range of the first control resource set is identical to the number of the physical resource blocks contained in the frequency domain range of the second control resource set, which are both 4, the physical resource blocks occupied by the second control resource set in the frequency domain range may be consecutive (for example, 4 physical resource blocks are all occupied), or may be inconsecutive (for example, only a first, third, and fourth physical resource blocks are occupied), and the physical resource blocks occupied by the first control resource set in the frequency domain may be consecutive or inconsecutive, and a particular implementation thereof is identical to that of the second control resource set, which shall not be described herein any further.

It can be seen from the above embodiments that in performing data mapping, the network device may determine that the first starting position on the predetermined resource onto which the data may be mapped is the second starting position of the frequency domain range of the first control resource set configured on the first BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 3

FIG. 7 is a schematic diagram of the resource configuration method of Embodiment 3, which is applicable to a network device side. As shown in FIG. 7, the method includes:

step 701: configuration information is transmitted to a terminal equipment; the configuration information being of at least one frequency domain offset relative to a starting position of a second BWP configured by a network device.

In an embodiment, the network device may pre-configure at least one frequency domain offset, and add a starting position of the second BWP to the at least one frequency domain offset to take them as a starting position of at least one virtual second BWP, so that the terminal equipment determines a starting position of frequency domain scheduling according to the starting position of the at least one virtual second BWP. Embodiment 4 below may be referred to for a particular implementation at the terminal equipment side, and how the network device configures the configuration information of the at least one frequency domain offset shall be particularly described below.

In an embodiment, the starting position of the second BWP may be denoted by an index #Z or a frequency P of a physical resource block, that is, the starting position of the second BWP is a frequency domain starting position of a physical resource block having a lowest index; for example, the index of the physical resource block having the lowest index is #Z. In one implementation, the frequency domain offset may be denoted by the number of physical resource blocks; for example, the configuration information includes Y frequency domain offsets, 1, 2, 3 . . . Y; where, 1, 2, 3 . . . Y denote the number of physical resource blocks, and according to the configuration information, the starting positions of the at least one virtual second BWP may be determined as being #Z+1, #Z+2, #Z+3, . . . , #Z+Y, which are illustrative only, and this embodiment is not limited thereto. In one implementation, the frequency domain offset may be denoted by the number of physical resource blocks and subcarrier spacing, and the subcarrier spacing may be equal to the subcarrier spacing of the second BWP, or may be configured as needed, and this embodiment is not limited thereto. The configuration information includes Y frequency domain offsets and subcarrier spacings N, which are 1, 2, 3 . . . Y, respectively; where 1, 2, 3 . . . Y denote the number of the physical source blocks. It may be determined according to the configuration information that the starting positions of the at least one virtual second BWP are P+1*12*N, P+2*12*N, . . . , P+Y*12*N. And in one implementation, the frequency domain offset may be directly denoted by a frequency offset, which shall not be enumerated herein any further.

In an embodiment, the number of Ys may be determined as needed, and this embodiment is not limited thereto.

In an embodiment, the configuration information may be transmitted via remaining minimum system information (RMSI) and/or RRC signaling, such as carrying the configuration information by the RMSI or the RRC signaling respectively, or carrying the configuration information by the RMSI and the RRC signaling jointly; the RMSI and the RRC signaling respectively carry a part of the information in the configuration information; for example, the RMSI carries the at least one frequency domain offset, and the RRC signaling identifies the at least one frequency domain offset via an index, or indicate an available virtual BWP via a bitmap. The virtual BWP is a virtual result of the second BWP after being subjected to the above frequency domain offset, and this embodiment is not limited thereto.

In an embodiment, reference may be made to Embodiment 1 for a particular implementation of the second BWP, which shall not be described herein any further.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 4

Figure 8:
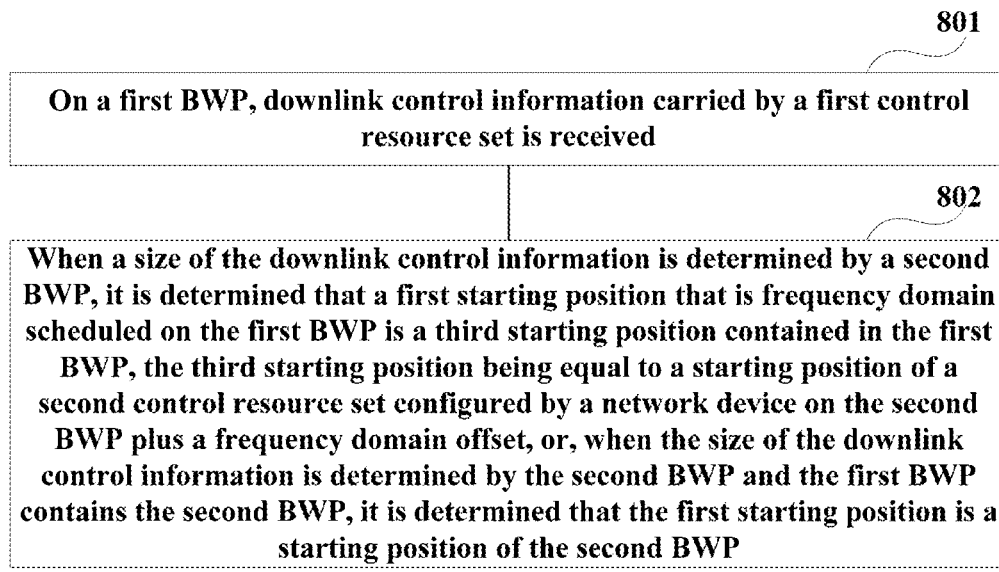
FIG. 8 is a schematic diagram of the resource scheduling method of Embodiment 4.

FIG. 8 is a schematic diagram of the resource scheduling method of Embodiment 4, which is applicable to a terminal equipment side. As shown in FIG. 8, the method includes:

step 801: on a first BWP, downlink control information carried by a first control resource set is received; and step 802: when a size of the downlink control information is determined by a second BWP, it is determined that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, it is determined that the first starting position is a starting position of the second BWP.

In an embodiment, reference may be made to step 201 in Embodiment 1 for an implementation of step 801, which shall not be described herein any further.

In an embodiment, one implementation of step 802 is that when the size of the downlink control information is determined by the second BWP, determining the first starting position that is frequency domain scheduled on the first BWP is the third starting position contained in the first BWP, the third starting position being equal to the starting position of the second control resource set configured by the network device on the second BWP plus the frequency domain offset.

In this embodiment, reference may be made to Embodiment 1 for a particular implementation of determining the size of the downlink control information by the second BWP, which shall not be described herein any further.

In this embodiment, the method further includes (not shown): receiving configuration information configured by a network device; the configuration information being of at least one frequency domain offset relative to the starting position of the second BWP; reference may be made to Embodiment 3 for particular contents and a transmission manner of the configuration information, which shall not be described herein any further.

In this embodiment, the first starting position that is frequency domain scheduled on the first BWP is determined as the third starting position contained in the first BWP, that is, the first starting position is aligned with the third starting position. The third starting position is equal to the starting position of the second control resource set configured by the network device on the second BWP plus the frequency domain offset; the frequency domain offset may be determined according to the configuration information.

In this embodiment, reference may be made to the virtual starting position of the second BWP for a particular implementation of the third starting position, the contents of which being incorporated herein, and being not going to be described herein any further.

In this embodiment, when one third starting position is contained in the first BWP, that is, when one third starting position is in the frequency domain of the first BWP, the third starting position is taken as the first starting position; and when multiple (at least two) third starting positions are contained in the first BWP, that is, when multiple third starting positions are all in the frequency domain of the first BWP, one of the third starting positions is selected and taken as the first starting position, such as selecting a third starting position having a highest frequency domain position or lowest frequency domain position and taking it as the first starting position. However, this embodiment is not limited thereto, and a third starting position at another position may also be selected and taken as the first starting position.

In an embodiment, another implementation of step 802 is when the size of the downlink control information is determined by the second BWP, and the first BWP includes the second BWP, determining that the first starting position is the starting position of the second BWP.

In this embodiment, if the first BWP includes the second BWP, that is, the frequency domain range of the BWP falls within the frequency domain of the first BWP, it is determined that the first starting position is the starting position of the second BWP, that is, the first starting position is aligned with the starting position of the second BWP. The starting position of the second BWP may be determined according to the relevant art, and may be denoted by, for example, frequency information, or a physical resource block index (a lowest index of a PRB occupied by the second BWP), which shall not be described herein any further.

In an embodiment, a maximum number of consecutive physical resource blocks that is able to be scheduled by the terminal device is the number of the consecutive physical resource blocks occupied by the second BWP, which are scheduled according to the subcarrier spacing of the first BWP. The "able to" described above indicates a frequency domain width that is able to be scheduled by the terminal equipment, but does not indicate a resource that is actually received by the data.

In an embodiment, reference may be made to Embodiment 1 for particular implementations of the first BWP and the second BWP, which shall not be described herein any further.

In an embodiment, the method may further include (optional, not shown): receiving, on the first BWP, a common message and/or a dedicated message. In this step, according to that the first starting position is taken as the starting point of the scheduling in step 802, and in combination with reference to the resource allocation information in the DCI, the common information is received on a PDSCH of the first BWP.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 5

Embodiment 5 provides a data transmission apparatus. As a principle of the apparatus for solving problems is similar to that of the method in Embodiment 2, the implementation of the method in Embodiment 2 may be referred to for implementation of the apparatus, with identical contents being not going to be described herein any further.

Figure 9:
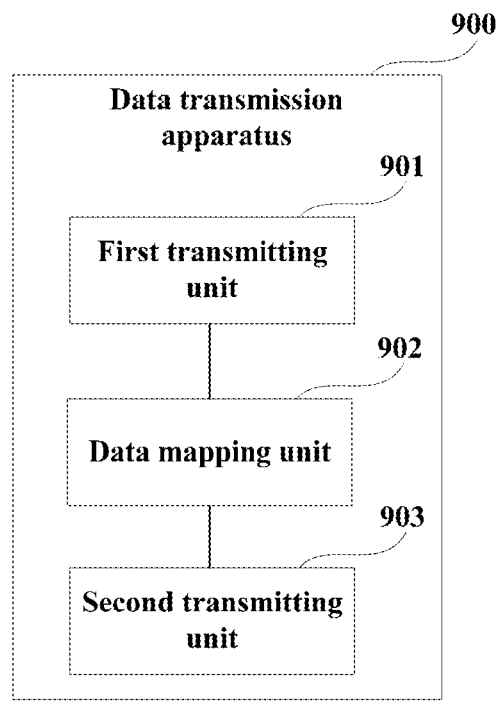
FIG. 9 is a schematic diagram of a structure of the data transmission apparatus of Embodiment 5.

FIG. 9 is a schematic diagram of the data transmission apparatus of Embodiment 5. As shown in FIG. 9, a data transmission apparatus 900 includes:

a first transmitting unit 901 configured to transmit downlink control information to a terminal equipment on a first BWP;

a data mapping unit 902 configured to map data onto one or more predetermined resources; when a size of the downlink control information is determined by a second BWP, a first starting position of the data that can be mapped onto the predetermined resources is a second starting position of a frequency domain range of a first control resource set configured on the first BWP; and a second transmitting unit 903 configured to transmit the data to the terminal equipment on the predetermined resources.

In an embodiment, the first starting position is a lowest index of physical resource blocks occupied by the predetermined resources, and the data is included in a common message and/or a dedicated message.

In an embodiment, according to a size of the second BWP, the data mapping unit 902 determines a frequency domain width of the predetermined resources onto which the data can be mapped.

In an embodiment, the data mapping unit 902 determines that the maximum number of consecutive physical resource blocks occupied by the frequency domain width of the predetermined resources is equal to the number of physical resource blocks occupied by the second BWP.

In an embodiment, when the data mapping unit 902 maps the data onto the predetermined resources in a distributed mapping manner, the data mapping unit 902 maps the data onto a predetermined frequency domain range of the predetermined resources in a distributed manner, the predetermined frequency domain range being equal to the size of the second BWP.

In an embodiment, the apparatus may further include (not shown):

a third transmitting unit configured to transmit to the terminal equipment first configuration information of a first control resource set configured by a network device on the first BWP, the first configuration information including information on a frequency domain range of the first control resource set;

when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

In an embodiment, when a subcarrier spacing of the first BWP is identical to a subcarrier spacing of the second BWP, a bandwidth of the frequency domain range of the first control resource set is identical to a bandwidth of a frequency domain range of a second control resource set configured by the network device on the second BWP, and when the subcarrier spacing of the first BWP is different from the subcarrier spacing of the second BWP, the bandwidth of the frequency domain range of the first control resource set is equal to the bandwidth of the frequency domain range of the second control resource set configured by the network device on the second BWP multiplied by the predetermined scaling factor.

In an embodiment, the scaling factor is equal to a ratio of the subcarrier spacing of the first BWP to the subcarrier spacing of the second BWP.

In an embodiment, the number of physical resource blocks contained in the frequency domain range of the first control resource set is identical to the number of physical resource blocks contained in the frequency domain range of the second control resource set.

In an embodiment, the physical resource blocks occupied by the first control resource set and/or the second control resource set are consecutive or inconsecutive. In an embodiment, the second BWP is an initial BWP, and the first BWP is a currently activated BWP.

In an embodiment, that a size of the downlink control information is determined by a second BWP includes:

a format of the downlink control information being 1-0, and the downlink control information being detected in a common search space, or a format of the downlink control information being 1-0, and the downlink control information being detected in a dedicated search space.

In an embodiment, reference may be made to steps 501-503 in Embodiment 2 for particular implementations of the first transmitting unit 901, the data mapping unit 902 and the second transmitting unit 903, which shall not be described herein any further.

It can be seen from the above embodiments that in performing data mapping, the network device may determine that the first starting position on the predetermined resource onto which the data may be mapped is the second starting position of the frequency domain range of the first control resource set configured on the first BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 6

Embodiment 6 provides a network device. As a principle of the device for solving problems is similar to that of the method in Embodiment 2, the implementation of the method in Embodiment 2 may be referred to for implementation of the device, with identical contents being not going to be described herein any further.

Figure 10:
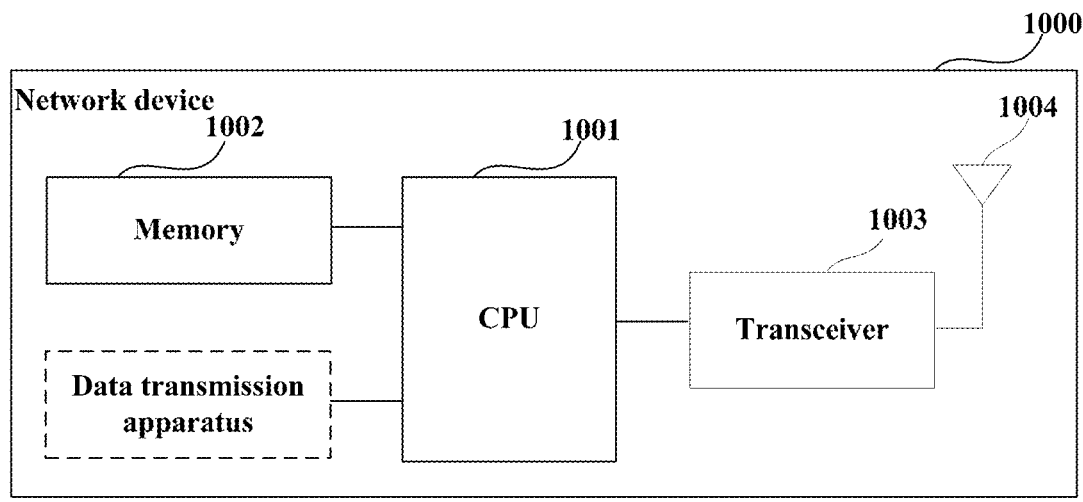
FIG. 10 is a schematic diagram of a structure of the network device of Embodiment 6.

FIG. 10 is a block diagram of a structure of the network device of the embodiment of this disclosure. As shown in FIG. 10, a network device 1000 may include a central processing unit (CPU) 1001 and a memory 1002, the memory 1002 being coupled to the central processing unit 1001. The memory 1002 may store various data, and furthermore, it may store a program for data processing, and execute the program under control of the central processing unit 1001, so as to transmit related information.

In one embodiment, the functions of the apparatus 900 may be integrated into the central processing unit 1001. The central processing unit 1001 may be configured to carry out the data transmission method as described in Embodiment 2.

For example, the central processing unit 1001 may be configured to: transmit downlink control information to a terminal equipment on a first BWP; map data onto predetermined resources; when a size of the downlink control information is determined by a second BWP, a first starting position of the data that can be mapped onto the predetermined resources is a second starting position of a frequency domain range of a first control resource set configured on the first BWP; and transmit the data to the terminal equipment on the predetermined resources.

For example, the central processing unit 1001 may be configured to: determine a frequency domain width that is able to be scheduled according to a size of the second BWP, the maximum number of consecutive physical resource blocks occupied by the frequency domain width that is able to be scheduled being equal to the number of physical resource blocks occupied by the second BWP.

For example, the central processing unit 1001 may be configured to: when the data are mapped onto the predetermined resources in a distributed mapping manner, map the data onto a predetermined frequency domain range of the predetermined resources in a distributed manner, the predetermined frequency domain range being equal to the size of the second BWP.

For example, the central processing unit 1001 may be configured to: transmit to the terminal equipment first configuration information of a first control resource set configured by a network device on the first BWP, the first configuration information including information on a frequency domain range of the first control resource set;

when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

And furthermore, reference may be made to Embodiment 2 for other configuration modes of the central processing unit 1001, which shall not be described herein any further.

In another embodiment, the apparatus 900 and the central processing unit 1001 may be configured separately. For example, the apparatus 900 may be configured as a chip connected to the central processing unit 1001, such as the units shown in FIG. 10, with its functions being realized under control of the central processing unit 1001.

Furthermore, as shown in FIG. 10, the network device 1000 may include a transceiver 1003, and an antenna 1004, etc. Functions of the above components are similar to those in the relevant art, and shall not be described herein any further. It should be noted that the network device 1000 does not necessarily include all the parts shown in FIG. 10, and furthermore, the network device 1000 may include parts not shown in FIG. 10, and the relevant art may be referred to.

It can be seen from the above embodiments that in performing data mapping, the network device may determine that the first starting position on the predetermined resource onto which the data may be mapped is the second starting position of the frequency domain range of the first control resource set configured on the first BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 7

Embodiment 7 provides a resource configuration apparatus. As a principle of the apparatus for solving problems is similar to that of the method in Embodiment 3, the implementation of the method in Embodiment 3 may be referred to for implementation of the apparatus, with identical contents being not going to be described herein any further.

Figure 11:
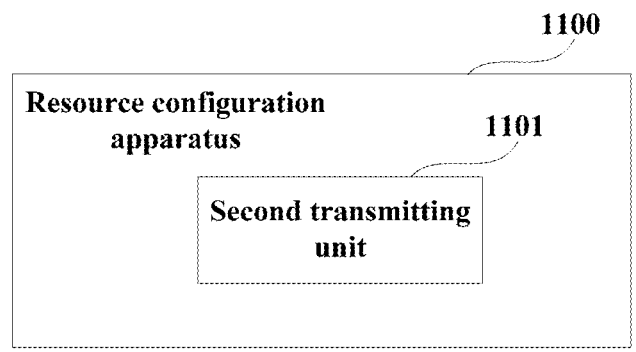
FIG. 11 is a schematic diagram of a structure of the resource configuration apparatus of Embodiment 7.

FIG. 11 is a schematic diagram of the resource configuration apparatus of the embodiment of this disclosure. As shown in FIG. 11, a resource configuration apparatus 1100 includes:

a second transmitting unit 1101 configured to transmit configuration information to a terminal equipment; the configuration information being of at least one frequency domain offset relative to a starting position of a second BWP configured by a network device.

In an embodiment, the second transmitting unit 1101 transmits the configuration information via a broadcast message or radio resource control signaling.

In an embodiment, the frequency domain offset may be denoted by the number of physical resource blocks.

In an embodiment, reference may be made to Embodiment 3 for a particular implementation of the second transmitting unit 1101, and reference may also be made to Embodiment 3 for particular meanings of the configuration information, the second BWP, the starting position and the frequency domain offset, which shall not be described herein any further.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 8

Embodiment 8 provides a network device. As a principle of the device for solving problems is similar to that of the method in Embodiment 3, the implementation of the method in Embodiment 3 may be referred to for implementation of the device, with identical contents being not going to be described herein any further.

Figure 12:
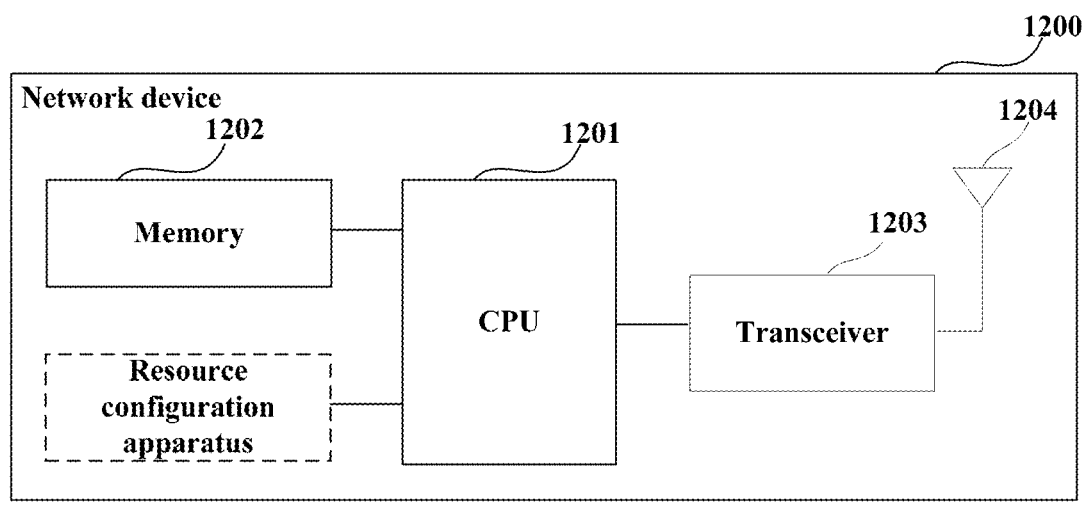
FIG. 12 is a schematic diagram of a structure of the network device of Embodiment 8.

FIG. 12 is a block diagram of a structure of the network device of the embodiment of this disclosure. As shown in FIG. 12, a network device 1200 may include a central processing unit (CPU) 1201 and a memory 1202, the memory 1202 being coupled to the central processing unit 1201. The memory 1202 may store various data, and furthermore, it may store a program for data processing, and execute the program under control of the central processing unit 1201, so as to transmit related information.

In one embodiment, the functions of the apparatus 1100 may be integrated into the central processing unit 1201. The central processing unit 1201 may be configured to carry out the resource configuration method as described in Embodiment 3.

For example, the central processing unit 1201 may be configured to: transmit configuration information to a terminal equipment; the configuration information being of at least one frequency domain offset relative to a starting position of a second BWP configured by a network device.

For example, the central processing unit 1201 may further be configured to: transmit the configuration information via a broadcast message or radio resource control signaling.

Furthermore, reference may be made to Embodiment 3 for other configuration modes of the central processing unit 1201, which shall not be described herein any further.

In another embodiment, the apparatus 1100 and the central processing unit 1201 may be configured separately. For example, the apparatus 1100 may be configured as a chip connected to the central processing unit 1201, such as the unit shown in FIG. 12, with its functions being realized under control of the central processing unit 1201.

Furthermore, as shown in FIG. 12, the network device 1200 may include a transceiver 1203, and an antenna 1204, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 9

Embodiment 9 provides a resource scheduling apparatus. As a principle of the apparatus for solving problems is similar to that of the method in Embodiment 1, the implementation of the method in Embodiment 1 may be referred to for implementation of the apparatus, with identical contents being not going to be described herein any further.

Figure 13:
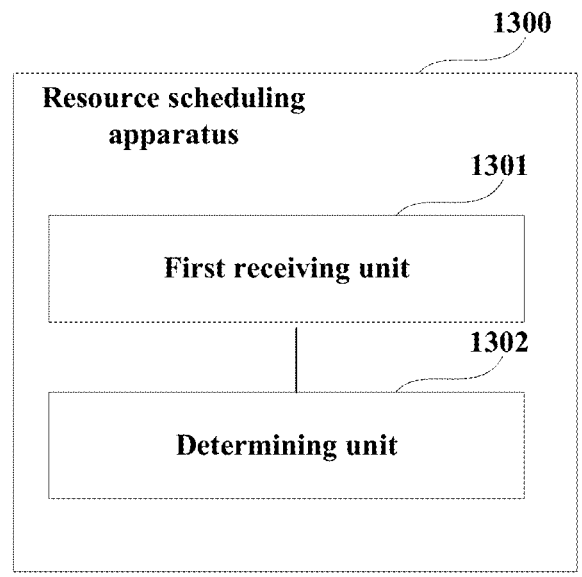
FIG. 13 is a schematic diagram of a structure of the resource scheduling apparatus of Embodiment 9.

FIG. 13 is a schematic diagram of a structure of the resource scheduling apparatus of the embodiment of this disclosure. As shown in FIG. 13, a resource scheduling apparatus 1300 includes:

a first receiving unit 1301 configured to, on a first BWP, receive downlink control information carried by a first control resource set; and a determining unit 1302 configured to, when a size of the downlink control information is determined by a second BWP, determine that a first starting position that is frequency domain scheduled on the first BWP is a second starting position of a frequency domain range of the first control resource set.

In an embodiment, reference may be made to steps 201-202 in Embodiment 1 for particular implementations of the first receiving unit 1301 and the determining unit 1302, which shall not be described herein any further.

In an embodiment, when the size of the downlink control information is determined by the second BWP, the determining unit 1302 determines a frequency domain width that is able to be scheduled according to a size of the second BWP.

In an embodiment, the determining unit 1302 determines that the maximum number of consecutive physical resource blocks occupied by the frequency domain width that is able to be scheduled is equal to the number of physical resource blocks occupied by the second BWP.

In an embodiment, the apparatus may further include (not shown):

a second receiving unit configured to receive, on the first BWP, a common message and/or a dedicated message.

In an embodiment, the apparatus may further include (not shown):

a third receiving unit configured to receive first configuration information of the first control resource set configured on the first BWP transmitted by a network device, the first configuration information including information on the frequency domain range of the first control resource set;

when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

In an embodiment, reference may be made to Embodiment 1 for particular implementations of the first BWP, the second BWP and the size of the downlink control information, which shall not be described herein any further.

It can be seen from the above embodiments that the terminal equipment makes that the starting position of its frequency domain scheduling is aligned with the starting position of the frequency domain of the control resource set configured on another BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 10

Embodiment 10 provides a terminal equipment. As a principle of the equipment for solving problems is similar to that of the method in Embodiment 1, the implementation of the method in Embodiment 1 may be referred to for implementation of the equipment, with identical contents being not going to be described herein any further.

Figure 14:
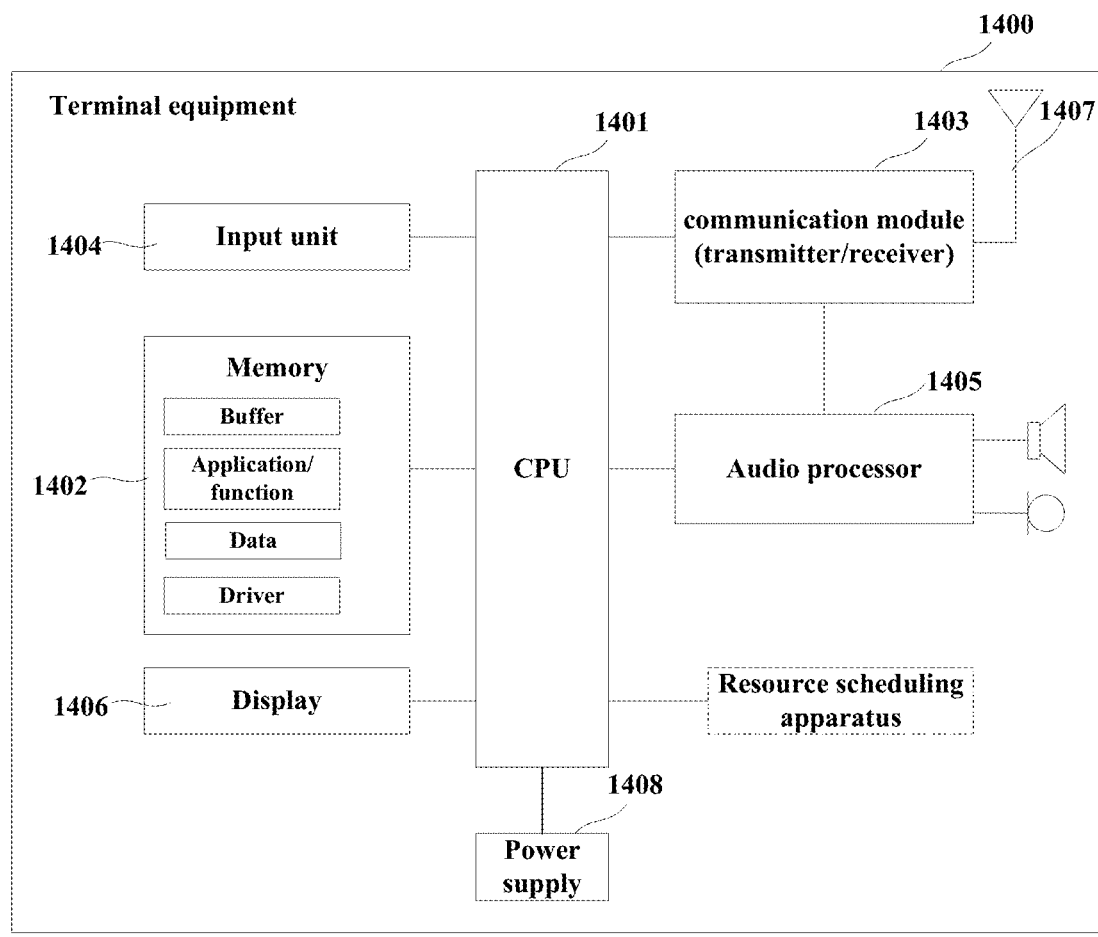
FIG. 14 is a schematic diagram of a structure of the terminal equipment of Embodiment 10.

FIG. 14 is a block diagram of a structure of the terminal equipment of the embodiment of this disclosure. As shown in FIG. 14, a user equipment 1400 may include a central processing unit (CPU) 1401 and a memory 1402, the memory 1402 being coupled to the central processing unit 1401. The memory 1402 may store various data, and furthermore, it may store a program for data processing, and execute the program under control of the central processing unit 1401, so as to receive related information.

In one embodiment, the functions of the apparatus 1300 may be integrated into the central processing unit 1401. The central processing unit 1401 may be configured to carry out the resource scheduling method as described in Embodiment 1.

For example, the central processing unit 1401 may be configured to: on a first BWP, receive downlink control information carried by a first control resource set; and when a size of the downlink control information is determined by a second BWP, determine that a first starting position that is frequency domain scheduled on the first BWP is a second starting position of a frequency domain range of the first control resource set.

For example, the central processing unit 1401 may be configured to: when the size of the downlink control information is determined by the second BWP, determine a frequency domain width that is able to be scheduled according to a size of the second BWP.

For example, the central processing unit 1401 may be configured to: determine that the maximum number of consecutive physical resource blocks occupied by the frequency domain width that is able to be scheduled is equal to the number of physical resource blocks occupied by the second BWP.

For example, the central processing unit 1401 may be configured to: receive, on the first BWP, a common message and/or a dedicated message.

For example, the central processing unit 1401 may be configured to: receive first configuration information of the first control resource set configured on the first BWP transmitted by a network device, the first configuration information including information on the frequency domain range of the first control resource set;

when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

In an embodiment, reference may be made to Embodiment 1 for particular implementations of the first BWP, the second BWP and the size of the downlink control information, which shall not be described herein any further.

And furthermore, reference may be made to Embodiment 1 for other configuration modes of the central processing unit 1401, which shall not be described herein any further.

In another embodiment, the apparatus 1300 and the central processing unit 1401 may be configured separately. For example, the apparatus 1300 may be configured as a chip connected to the central processing unit 1401, such as the units shown in FIG. 14, with its functions being realized under control of the central processing unit 1401.

Furthermore, as shown in FIG. 14, the user equipment 1400 may include a communication module 1403, an input unit 1404, a display 1406, an audio processor 1405, an antenna 1407, and a power supply 1408, etc. Functions of the above components are similar to those in the relevant art, and shall not be described herein any further. It should be noted that the user equipment 1400 does not necessarily include all the parts shown in FIG. 14, and furthermore, the user equipment 1400 may include parts not shown in FIG. 14, and the relevant art may be referred to.

It can be seen from the above embodiments that the terminal equipment makes that the starting position of its frequency domain scheduling is aligned with the starting position of the frequency domain of the control resource set configured on another BWP. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 11

Embodiment 11 provides a resource scheduling apparatus. As a principle of the apparatus for solving problems is similar to that of the method in Embodiment 4, the implementation of the method in Embodiment 4 may be referred to for implementation of the apparatus, with identical contents being not going to be described herein any further.

Figure 15:
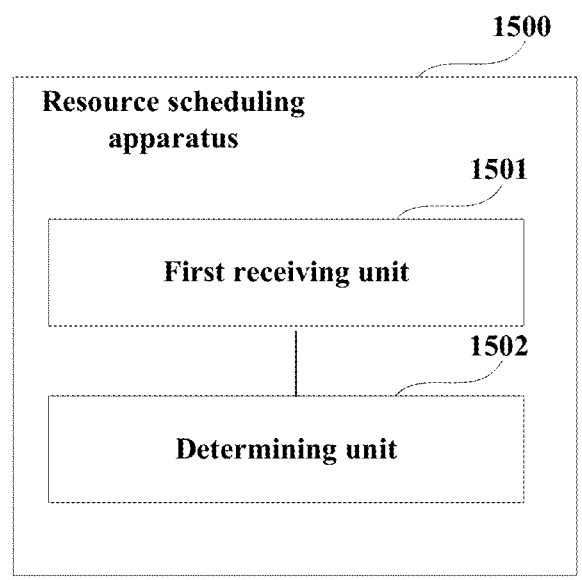
FIG. 15 is a schematic diagram of a structure of the resource scheduling apparatus of Embodiment 11.

FIG. 15 is a schematic diagram of a structure of the resource scheduling apparatus of the embodiment of this disclosure. As shown in FIG. 15, a resource scheduling apparatus 1500 includes:

a first receiving unit 1501 configured to, on a first BWP, receive downlink control information carried by a first control resource set; and a determining unit 1502 configured to, when a size of the downlink control information is determined by a second BWP, determine that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, the determining unit determines that the first starting position is a starting position of the second BWP.

In an embodiment, reference may be made to steps 801-802 in Embodiment 4 for particular implementations of the first receiving unit 1501 and the determining unit 1502, which shall not be described herein any further.

In an embodiment, when the size of the downlink control information is determined by the second BWP, the determining unit 1502 determines that the maximum number of consecutive physical resource blocks that are able to be scheduled is equal to the number of physical resource blocks occupied by the second BWP.

In an embodiment, the apparatus may further include:

a second receiving unit (optional, not shown) configured to receive, on the first BWP, a common message and/or a dedicated message.

In an embodiment, the apparatus may further include:

a fourth receiving unit (optional, not shown) configured to receive configuration information of at least one frequency domain offset relative to the starting position of the second BWP.

In an embodiment, when the first BWP contains at least two third starting positions, the determining unit 1502 determines that the first starting position is a highest or lowest third starting position.

In an embodiment, the fourth receiving unit receives the configuration information via a broadcast message or radio resource control signaling.

In an embodiment, reference may be made to Embodiment 4 for a particular implementations of the second receiving unit and the fourth receiving unit, which shall not be described herein any further.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 12

Embodiment 12 provides a terminal equipment. As a principle of the equipment for solving problems is similar to that of the method in Embodiment 4, the implementation of the method in Embodiment 4 may be referred to for implementation of the equipment, with identical contents being not going to be described herein any further.

Figure 16:
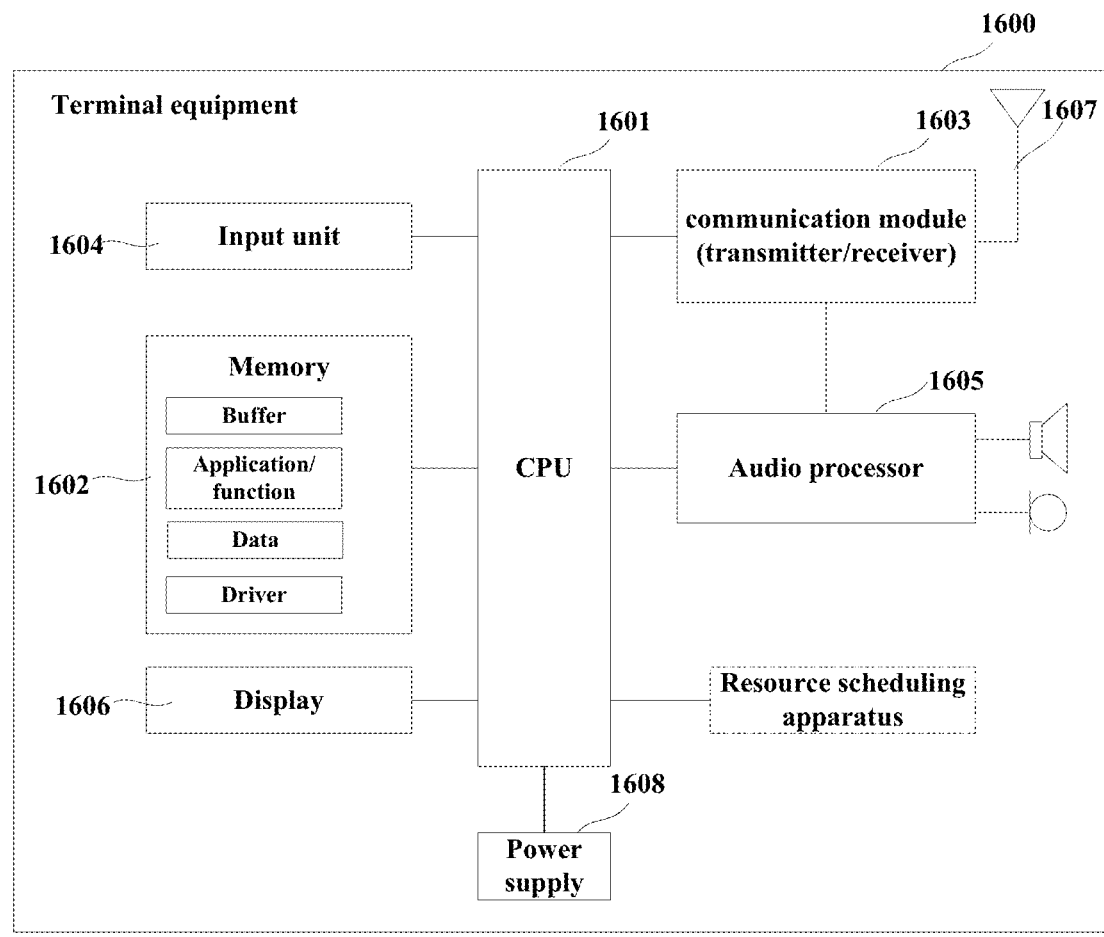
FIG. 16 is a schematic diagram of a structure of the terminal equipment of Embodiment 12.

FIG. 16 is a block diagram of a structure of the terminal equipment of the embodiment of this disclosure. As shown in FIG. 16, a terminal equipment 1600 may include a central processing unit (CPU) 1601 and a memory 1602, the memory 1602 being coupled to the central processing unit 1601. The memory 1602 may store various data, and furthermore, it may store a program for data processing, and execute the program under control of the central processing unit 1601, so as to receive related information.

In one embodiment, the functions of the apparatus 1500 may be integrated into the central processing unit 1601. The central processing unit 1601 may be configured to carry out the resource scheduling method as described in Embodiment 4.

For example, the central processing unit 1601 may be configured to: on a first BWP, receive downlink control information carried by a first control resource set; and when a size of the downlink control information is determined by a second BWP, determine that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, the determining unit determines that the first starting position is a starting position of the second BWP.

For example, the central processing unit 1601 may be configured to: when the size of the downlink control information is determined by the second BWP, determine that the maximum number of consecutive physical resource blocks that are able to be scheduled is equal to the number of physical resource blocks occupied by the second BWP.

For example, the central processing unit 1601 may be configured to: receive, on the first BWP, a common message and/or a dedicated message.

For example, the central processing unit 1601 may be configured to: receive configuration information of at least one frequency domain offset relative to the starting position of the second BWP.

For example, the central processing unit 1601 may be configured to: when the first BWP contains at least two third starting positions, determine that the first starting position is a highest or lowest third starting position.

For example, the central processing unit 1601 may be configured to: receive the configuration information via a broadcast message or radio resource control signaling.

Furthermore, reference may be made to Embodiment 4 for other configuration implementations of the central processing unit 1601, which shall not be described herein any further.

In another embodiment, the apparatus 1500 and the central processing unit 1601 may be configured separately. For example, the apparatus 1500 may be configured as a chip connected to the central processing unit 1601, such as the units shown in FIG. 16, with its functions being realized under control of the central processing unit 1601.

Furthermore, as shown in FIG. 16, the user equipment 1600 may include a communication module 1603, an input unit 1604, a display 1606, an audio processor 1605, an antenna 1607, and a power supply 1608, etc. Functions of the above components are similar to those in the relevant art, and shall not be described herein any further. It should be noted that the user equipment 1600 does not necessarily include all the parts shown in FIG. 16, and furthermore, the user equipment 1600 may include parts not shown in FIG. 16, and the relevant art may be referred to.

It can be seen from the above embodiments that the network device configures at least one virtual starting position of the second BWP for the terminal equipment, so that the terminal equipment determines the starting position of its frequency domain scheduling. Hence, more terminal equipments may be made to receive and share common messages and system resource overhead may be saved. And furthermore, it may be used to receive the dedicated message from the terminal equipment, so as to ensure robustness when the BWP is switched, thereby solving an existing problem.

Embodiment 13

Embodiment 13 provides a communication system. As shown in FIG. 1, the communication system includes a network device 101 and/or terminal equipment 102.

Reference may be made to the network device 1000 or the network device 1200 in Embodiment 6 or 8 for a particular implementation of the network device 101, and reference may be made to the terminal equipment 1400 or the terminal equipment 1600 in Embodiment 10 or 12 for a particular implementation of the terminal equipment 102, the contents of which being incorporated herein, which shall not be described herein any further.

An embodiment of the present disclosure provides a computer storage medium, including a computer readable program code, which may cause a data transmission apparatus or a network device to carry out the data transmission method as described in Embodiment 2.

An embodiment of the present disclosure provides a computer readable program code, which, when executed in a data transmission apparatus or a network device, may cause the data transmission apparatus or the network device to carry out the data transmission method as described in Embodiment 2.

An embodiment of the present disclosure provides a computer storage medium, including a computer readable program code, which may cause a resource configuration apparatus or a network device to carry out the resource configuration method as described in Embodiment 3.

An embodiment of the present disclosure provides a computer readable program code, which, when executed in a resource configuration apparatus or a network device, may cause the resource configuration apparatus or the network device to carry out the resource configuration method as described in Embodiment 3.

An embodiment of the present disclosure provides a computer storage medium, including a computer readable program code, which may cause a resource determination apparatus or user equipment to carry out the resource scheduling method as described in Embodiment 1 or 4.

An embodiment of the present disclosure provides a computer readable program code, which, when executed in a resource determination apparatus or user equipment, may cause the resource determination apparatus or the user equipment to carry out the resource scheduling method as described in Embodiment 1 or 4.

The above apparatuses and method of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The power control methods carried out in the power control apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 9-17 may either correspond to software modules of procedures of a computer program, or correspond to hardware modules. Such software modules may respectively correspond to the steps shown in FIGS. 2, 5, 7 and 8. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 9-17 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 9-17 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

Supplement 1. A resource scheduling method, including:
on a first BWP, receiving downlink control information carried by a first control resource set; and
when a size of the downlink control information is determined by a second BWP, determining that a first starting position that is frequency domain scheduled on the first BWP is a second starting position of a frequency domain range of the first control resource set.

Supplement 2. The method according to supplement 1, wherein when the size of the downlink control information is determined by the second BWP, a frequency domain width that is able to be scheduled is determined according to a size of the second BWP.

Supplement 3. The method according to supplement 2, wherein the maximum number of consecutive physical resource blocks occupied by the frequency domain width that is able to be scheduled is determined as being equal to the number of physical resource blocks occupied by the second BWP.

Supplement 4. The method according to supplement 1, wherein the method further includes:
on the first BWP, receiving a common message and/or a dedicated message.

Supplement 5. The method according to supplement 1, wherein the method further includes:
receiving first configuration information of the first control resource set configured on the first BWP transmitted by a network device, the first configuration information including information on the frequency domain range of the first control resource set;

and wherein when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

Supplement 6. The method according to supplement 1, wherein the second BWP is an initial BWP, and the first BWP is a currently-activated BWP.

Supplement 7. The method according to supplement 1, wherein that a size of the downlink control information is determined by a second BWP includes:

a format of the downlink control information being 1-0, and the downlink control information being detected in a common search space; or a format of the downlink control information being 1-0, and the downlink control information being detected in a dedicated search space.

Supplement 8. The method according to supplement 1, wherein the method further includes:

receiving second configuration information on the first BWP transmitted by the network device, the second configuration information including a highest index of physical resource blocks of the first BWP, the number of physical resource blocks between the highest index and the first starting position being greater than or equal to the number of physical resource blocks occupied by the second BWP.

Supplement 9. A data transmission method, including:

transmitting downlink control information to a terminal equipment on a first BWP;

mapping data onto one or more predetermined resources; wherein, when a size of the downlink control information is determined by a second BWP, a first starting position of the data that can be mapped onto the predetermined resources is a second starting position of a frequency domain range of a first control resource set configured on the first BWP; and transmitting the data to the terminal equipment on the predetermined resources.

Supplement 10. The method according to supplement 9, wherein the first starting position is a lowest index of physical resource blocks occupied by the predetermined resources.

Supplement 11. The method according to supplement 9, wherein, according to a size of the second BWP, a frequency domain width of the predetermined resources onto which the data can be mapped is determined.

Supplement 12. The method according to supplement 11, the maximum number of consecutive physical resource blocks occupied by the frequency domain width of the predetermined resources is determined as being equal to the number of physical resource blocks occupied by the second BWP.

Supplement 13. The method according to supplement 9, wherein when the data are mapped onto the predetermined resources in a distributed mapping manner, the data are mapped onto a predetermined frequency domain range of the predetermined resources in a distributed manner, the predetermined frequency domain range being equal to the size of the second BWP.

Supplement 14. The method according to supplement 9, wherein the data is included in a common message and/or a dedicated message.

Supplement 15. The method according to supplement 9, wherein the method further includes:

transmitting to the terminal equipment first configuration information of a first control resource set configured by a network device on the first BWP, the first configuration information including information on a frequency domain range of the first control resource set;

and wherein when the size of the downlink control information carried by the first control resource set is determined by the second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

Supplement 16. The method according to supplement 15, wherein when a subcarrier spacing of the first BWP is identical to a subcarrier spacing of the second BWP, a bandwidth of the frequency domain range of the first control resource set is identical to a bandwidth of a frequency domain range of a second control resource set configured by the network device on the second BWP, and when the subcarrier spacing of the first BWP is different from the subcarrier spacing of the second BWP, the bandwidth of the frequency domain range of the first control resource set is equal to the bandwidth of the frequency domain range of the second control resource set configured by the network device on the second BWP multiplied by the predetermined scaling factor.

Supplement 17. The method according to supplement 15 or 16, wherein the scaling factor is equal to a ratio of the subcarrier spacing of the first BWP to the subcarrier spacing of the second BWP.

Supplement 18. The method according to supplement 15, wherein the number of physical resource blocks contained in the frequency domain range of the first control resource set is identical to the number of physical resource blocks contained in the frequency domain range of the second control resource set.

Supplement 19. The method according to supplement 15, wherein the physical resource blocks occupied by the first control resource set and/or the second control resource set are consecutive or inconsecutive.

Supplement 20. A resource scheduling method, including:

on a first BWP, receiving downlink control information carried by a first control resource set; and when a size of the downlink control information is determined by a second BWP, determining that a first starting position that is frequency domain scheduled on the first BWP is a third starting position contained in the first BWP, the third starting position being equal to a starting position of a second control resource set configured by a network device on the second BWP plus a frequency domain offset, or, when the size of the downlink control information is determined by the second BWP and the first BWP contains the second BWP, determining that the first starting position is a starting position of the second BWP.

Supplement 21. A resource configuration method, including:

transmitting first configuration information of a first control resource set configured on a first BWP configured by a network device to a terminal equipment, the first configuration information including information on a frequency domain range of the first control resource set;

wherein when a size of the downlink control information carried by the first control resource set is determined by a second BWP, the frequency domain range of the first control resource set is identical to a frequency domain range of a second control resource set configured by the network device on the second BWP, or the frequency domain range of the first control resource set is equal to the frequency domain range of the second control resource set configured by the network device on the second BWP multiplied by a predetermined scaling factor.

Supplement 22. A resource configuration method, including:

transmitting configuration information to a terminal equipment; the configuration information being of at least one frequency domain offset relative to a starting position of a second BWP configured by a network device.

Supplement 23. A communication system, including a terminal equipment, the terminal equipment including a resource scheduling apparatus configured to perform the resource scheduling method according to supplement 1 or 20.

What is claimed is:

1. A resource scheduling apparatus, comprising:
   a first receiver configured to, on a first BWP, receive downlink control information carried by a first control resource set; and
   a processor configured to, when the downlink control information being detected in a common search space, determine that a first starting position used for a frequency domain scheduling on the first BWP is aligned with a second starting position of a frequency domain range of the first control resource set.

2. The apparatus according to claim 1, wherein the apparatus further comprises:
   a second receiver configured to receive, on the first BWP, a common message.

3. The apparatus according to claim 1, wherein the apparatus further comprises:
   a third receiver configured to receive first configuration information of the first control resource set configured on the first BWP transmitted by a network device, the first configuration information comprising information on the frequency domain range of the first control resource set, wherein the first configuration information is used to determine the second start position.

4. The apparatus according to claim 1, wherein the first BWP is a currently-activated BWP.

5. The apparatus according to claim 1, wherein a format of the downlink control information being 1-0.

6. The apparatus according to claim 1, wherein the apparatus further comprises:
   a fourth receiver configured to receive second configuration information of the first BWP transmitted by the network device, the second configuration information comprising a highest index of physical resource blocks of the first BWP.

7. A data transmission apparatus, comprising:
   a first transmitter configured to transmit downlink control information to a terminal equipment on a first BWP;
   a data mapper configured to map data onto one or more predetermined resources, wherein, when the downlink control information being detected in a common search space, a first starting position of the data, where the first starting positon is configured to be mapped onto the predetermined resources, is aligned with a second starting position of a frequency domain range of a first control resource set configured on the first BWP; and
   a second transmitter configured to transmit the data to the terminal equipment on the predetermined resources.

8. The apparatus according to claim 7, wherein the first starting position is a lowest index of physical resource blocks occupied by the predetermined resources.

9. The apparatus according to claim 7, wherein the data is comprised in a common message.

10. The apparatus according to claim 7, wherein the apparatus further comprises:
    a third transmitter configured to transmit to the terminal equipment first configuration information of a first control resource set configured by a network device on the first BWP, the first configuration information comprising information on a frequency domain range of the first control resource set, wherein the first configuration information is used to determine the second start positon.

* * * * *